United States Patent [19]
Lehr

[11] Patent Number: 5,898,873
[45] Date of Patent: Apr. 27, 1999

[54] SYSTEM AND METHOD FOR VISUALIZING SYSTEM OPERATION TRACE CHRONOLOGIES

[75] Inventor: Theodore Franklin Lehr, Austin, Tex.

[73] Assignee: International Business Machines Corporation, Armonk, N.Y.

[21] Appl. No.: 08/747,496

[22] Filed: Nov. 12, 1996

[51] Int. Cl.⁶ .................................................... G06F 9/45
[52] U.S. Cl. .......................................... 395/704; 345/440
[58] Field of Search ........................ 395/182.13, 182.18, 395/677, 678, 704; 345/440; 702/186

[56] References Cited

U.S. PATENT DOCUMENTS

| | | | |
|---|---|---|---|
| 5,428,618 | 6/1995 | Ueki et al. | 395/704 |
| 5,442,740 | 8/1995 | Parikh | 345/440 |
| 5,442,744 | 8/1995 | Piech et al. | 345/302 |
| 5,563,994 | 10/1996 | Harmon et al. | 345/440 |
| 5,732,272 | 3/1998 | Gochee | 395/704 |

FOREIGN PATENT DOCUMENTS

| | | |
|---|---|---|
| 1-181135 | 7/1989 | Japan . |
| 5-189224 | 7/1993 | Japan . |
| 7-261744 | 10/1995 | Japan . |

OTHER PUBLICATIONS

"Measuring and Visualizing Client/Server Behavior," *Proceedings. SHARE Europe Anniversary Meeting*, pp. 429–440, 1993.

"PARAVER: A Tool to Visualize and Analyze Parallel Code," *Transputer and occam Developments, IOS Press*, vol. 44, pp. 17–31, 1995.

"Network Traffic Measurement of the X Window System," *IEEE 13th Annual International Phoenix Conference on Computers and Communications*, pp. 148–155, 1994.

"Analysis Tool for Parallel Systems," *IEEE Comput. Soc. Press*, pp. 499–505, 1992.

"Performance Visualization of Parallel Programs on a Shared Memory Multiprocessor System," 1989 *International Conference on Parallel Processing, Pennsylvania State University Press*, vol. 2, pp. 1–10, 1989.

"TRACER: A Debugging Tool for OS/2 Presentation Manager Development," *Microsoft Systems Journal*, vol. 5, No. 2, pp. 63–73, 1990.

"Test Data Visualization for Open System Standards," *SPIE Proceedings*, vol. 2178, pp. 154–164, 1994.

"Real–time Performance Analysis System ProBA/RTH," *NEC Technical Journal (Japan)*, vol. 47, No. 6, pp. 42–49, 1994.

"The Utility of Computer Tracing Tools for User–Centered Design," *Educational Technology*, vol. 33, No. 4, pp. 45–59, Apr. 1993.

"Experiences with Hypercube Operating System Instrumentation," *University of Illinois at Urbana–Champaign*, Report No. UIUCDCS–R–90–1588, 22 pp., Apr. 1990.

"An Approach to Concurrent Systems Debugging," *IEEE Computer Society Press*, pp. 507–514, 1985.

"Specifying Panel Flow Information in Panel Definition," *Research Disclosure*, No. 33125, 1991.

"Automatic Performance Measurments Tool for Window Response Time," *Research Disclosure*, No. 34653, 1993.

(List continued on next page.)

*Primary Examiner*—Tariq R. Hafiz
*Assistant Examiner*—Brian Sattizahn
*Attorney, Agent, or Firm*—Leslie A. Van Leeuwen; George E. Clark; Mark S. Walker

[57] ABSTRACT

The present invention is a system and method of parsing system trace information to generate separate timelines of schedulable processes. System operation trace files are accurately parsed into schedulable processes without reliance on explicit context switching information provided by an operating system or trace tool. The invention accurately detects and parses nested event-pairs for display by a visualization tool, and allows a user to view either a nested or unnested visualization.

20 Claims, 6 Drawing Sheets

OTHER PUBLICATIONS

Edwards, D; Kearns, P, DTVS: a Distributed Trace Visualization System, Proceedings, Sixth IEEE Symposium on Parallel and Distributed Processing, pp. 281–288, 1994.

Malony, A; Hammerslag, D; Jablonowski, D, Traceview: A Trace Visualization Tool, IEEE Software, vol. 8, Issue 5, pp. 19–28, Sep. 1991.

Data Structure and Insertion Algorithm for Representing Asynchronous Occurrences for Visualization by Trace Visualization Tools using Ghant Charts with Occurrence Heirarchies, IBM Technical Disclosure Bulletin, vol. 36, No. 7, pp. 547–557, Jul. 1993.

Heath, M; Etheridge, J., Visualizing the Performance of Parallel Programs, IEEE Software, vol. 8, Issue 5, pp. 29–39, Sep. 1991.

SYSTEM AND METHOD FOR VISUALIZING SYSTEM OPERATION TRACE CHRONOLOGIES

BACKGROUND OF THE INVENTION

1. Field of the Invention

The present invention relates to information processing systems and, more particularly, to software visualization tools and methods to visualize traces of application programs.

2. Description of Related Art

In a computer system, an operating system controls the allocation of system resources, including which task has control of the central processing unit (CPU) at any given time. As an application is running, different application tasks are given control and relinquish control of the CPU. There is also a task known as the "idle task," which is the task that has control when no application tasks are running. When the idle task is running, it is also referred to as system idle time.

While a task is running, different events may occur. For example, a task may execute a system call, call a function, or post a message to another task's queue. If more than one task is attempting to use the CPU at the same time, the operating system will allocate the CPU time between the tasks. As one task gives up control to another task (or to the idle task), a context switch occurs.

A trace of a computer system is a recording of the chronology of events or states that occur within the system. Events in a trace chronology are often paired, forming event-pairs. Examples of event-pairs include the start and end times of a program, function, or system call. The acquiring and relinquishing of the CPU by a task is also an event-pair. Event-pairs may be nested within one another, as when a task calls a function, which in turn calls another function.

To obtain a system trace, a user runs a software trace tool or uses a hardware support tool. These tools will capture and record events and states that occur while the system is executing. The typical output form of most traces is a text file with time-stamped entries. Other trace output forms include binary and hexadecimal trace output files.

A trace chronology is used by software developers for debugging and performance analysis. The typical text file trace output may be read by the developer, and is adequate for gaining an understanding of very small time periods within the trace. However, a text file trace output is too cumbersome for a developer to use when attempting to analyze large scale behavior and patterns contained in a trace.

Trace chronologies are more easily understood and utilized when displayed graphically along a time line by a visualization tool. A Ghant chart, also known as a bar chart or histogram, is a common format for displaying trace chronologies. In a Ghant chart, rectangles of various lengths that represent different event-pairs, or processes, are arranged chronologically along a time axis.

FIG. 1 is a depiction of a Ghant chart visualization tool as it exists in the prior art. As shown in FIG. 1, a window 10 is displayed on a display device. The Ghant chart is shown within a box 12. Processes 14 through 32 are listed in the left-hand side of the box 12. Each process has both an ID number and a name. For example, process number 26a8 (hexadecimal) 32 has the name pmworkclass 34. The bars to the right of each process name depict the events that occur as each process is running. Bar 36 shows the sequence of events that occur as process number 26a8 32 is running. The start time box 38 and end time box 40 tell the user the time frame depicted by the Ghant chart.

Event-pairs may be nested within one another, and current visualization tools do not adequately address the issue of nesting. Current tools show when more than one task is attempting to use the CPU during a particular time interval, but do not provide enough detail for a user to determine which task actually had control of the CPU at any given point in time.

FIGS. 2 and 3 illustrate this problem as it exists in the prior art. FIG. 2 shows a detailed view of one process line from a prior art visualization tool. Note that the rectangles are shown with different heights for emphasis only in this figure. They are often of equal height. In FIG. 2, the first process to run is the idle task 50. Event-pair A 52, most likely a task, is then given control. Other event-pairs, B 54, C 56, and D 58 are nested within event-pair A 52. Note that event-pairs C 56 and D 58 are also nested within event-pair B 54. After event-pair A 52 completes execution, the idle task 50 is given control. Next, event-pair E 60 starts to run. Event-pairs F 62, G 64, and H 66 are nested with event-pair E 60. Note that event-pair H 66 is also nested within event-pair G 64.

FIG. 3 shows a possible, spread visualization of the trace visualization shown in FIG. 2. Because the prior art does not properly depict nested event-pairs, the result is a visualization that appears to show a series of disjointed events. For example, event-pair A actually appears to be two separate event-pairs, 70 and 72, rather than one event-pair with other event-pairs nested within it.

A visualization tool can be roughly separated into two sets of technologies—an interactive visualizer and a suite of trace parsers. A trace parser formats the typical binary or text file trace output so that it can be displayed by the interactive visualizer portion of the visualization tool. Some operating systems, such as the IBM OS/2 operating system and the IBM AIX operating system allow a user to turn on a trace feature (OS/2 and AIX are trademarks of International Business Machines Corp.). When the trace feature is enabled, the operating system tracks context switches and other events as they occur. Operating systems which pre-emptively control context switches among tasks can explicitly track the context switches at trace time. The operating system will store this information in memory, where it can later be formatted and printed as a trace output file. A trace output file created in this way explicitly marks where context switches have occurred. Thus it is relatively simple to parse and understand this type of a trace output file.

Not all operating systems can explicitly trace context switches. In the case of some versions of Microsoft Windows, such as 3.x, tasks are context-switched using a mechanism in which competing tasks cooperate in sharing the CPU (Microsoft Windows is a trademark of Microsoft Corp.). A task switch is possible when a task checks the Windows message queue. Unlike preemptively scheduled tasks, it is not possible for a trace file to explicitly mark a context switch. Therefore, there is a need for a tool that can parse system traces of schedulable events even when context switches are not explicitly designated in the trace output file.

Additionally, there is a need for such a parser to format the trace data in such a way as to allow a visualization tool to accurately depict nested event-pairs, and CPU contention.

U.S. Pat. No. 5,442,744 to Piech, et al. discloses displaying and editing multimedia information using a timeline. Although the patent relates generally to displaying objects on separate timelines, the timelines represent independent, synchronized actions which do not share resources as do the objects in the present invention. The patent does not disclose any nesting of events within the timelines, and does not teach nor suggest the present invention as claimed herein.

Research Disclosure 346053 discloses a performance measurement tool for window response time. This tool adds additional, temporary function to a windowing system to capture the length of time required for a window to appear on a screen. The present invention makes no changes to the system being measured, rather the present invention uses available information to order the display of objects on to separate timelines.

Japanese Patent 07-261744 discloses a method of selecting what data is to be drawn on a trend chart. It does not teach the parsing of data in order that it may be presented visually on timelines, and thus does not teach nor suggest the present invention as claimed herein.

Research Disclosure 331025 discloses managing panel flow information in graphical user interface windows. It does not teach nor suggest the present invention as claimed herein.

An article in Proceedings, SHARE Europe Anniversary Meeting, Oct. 25–28, 1993, The Hague, The Netherlands, Client/Server—the Promise and the Reality, page 429, entitled "Measuring and visualizing Client/Server Behavior" by Jindal, et al. relates to the visualization tool, PieScope. It does not address parsing of trace data or nesting capabilities of a visualization tool, and thus does not teach nor suggest the present invention as claimed herein.

A report published by the University of Illinois at Urbana-Champaign entitled "Experiences With Hypercube Operating System Instrumentation" by Reed et al. discusses displaying objects on separate timelines, but does not disclose nesting of events within the timelines, and does not teach nor suggest the present invention as claimed herein.

An article in the 1994 IEEE 13th Annual International Conference on Computers and Communications (Cat. No. 94CH3399-3), page 148, entitled "Network Traffic Management of the X Window System" by Basil, et al. discusses measurements made of network traffic. It does not discuss parsers or tools to analyze traces.

An article in the Proceedings, Euromicro Workshop on Parallel and Distributed Processing, Gran Canaria, Spain Jan. 27–29, 1993, page 499, entitled "Analysis Tool for Parallel Systems" by Saiz, et al. discloses a tool for generating traces of parallel processes. It does not discuss parsing or analyzing these traces, nor does it disclose visualizing nested processes, as is taught and claimed by the present invention.

An article in the Proceedings of the 1989 International Conference on Parallel Processing (Cat. No. 89CH2701-1), St. Charles, Ill., USA, Aug. 8–12, 1989, page 1, entitled "Performance Visualization of Parallel Programs on a Shared Memory Multiprocessor System" by Bernstein, et al. discloses a method for generating and parsing traces from parallel Fortran programs. However, it does not teach mapping the traces onto a timeline so as to separate the scheduling of processes, as does the present invention. In addition, the disclosed method does not clearly show the resources held and when parallelism is accomplished in a system, and does not disclose a method for visualizing nested processes as is taught and claimed by the present invention.

An article in Proceedings of the 18th World occam and Transputer User Group Technical Meeting, Manchester, UK, Apr. 9–12, 1995, page 17, entitled "PARAVER: A Tool to Visualize and Analyze Parallel Code" by Pillet, et al. discusses a visualization tool which uses timelines. However, this article does not discuss parsing trace data and does not recognize nesting as is taught and claimed by the present invention.

An article in Proceedings, SPIE—The International Society for Optical Engineering, Visual Data Exploration and Analysis, San Jose, Calif., USA, Feb. 7–8, 1994, page 154, entitled "Test data visualization for open system standards" by Crane, et al. discloses a visualization tool which tries to fit geometric figures to statistical data. However, the article does not teach nor suggest the present invention as taught and claimed herein.

An article in the NEC Technology Journal, vol. 47, no. 6, July 1994, page 42, entitled "Real-time Performance Analysis System ProBA/RTH" by Nakamoto et al. discloses a hardware tracer and software tools that observe system timing behavior. However, the method disclosed in the article does not address nested processes, and does not teach nor suggest the present invention as taught and claimed herein.

While there is prior art dealing with visualization tools, no solution has yet been found to deal with the unique problem of parsing and formatting trace data which does not include explicit context switching detail, but rather contains implicit context switches. Also, no current visualization tool accurately depicts nesting of event-pairs.

Consequently, it would be desirable to have a system and method for a trace parser that would take trace file output from a systems trace and parse it for display by a visualization tool. It would also be desirable to parse the trace information in such a way that traced processes could be accurately displayed in either a nested or unnested manner by the visualization tool.

SUMMARY OF THE INVENTION

The present invention is a system and method of parsing system trace information to generate separate timelines of schedulable processes. The invention does not rely on explicit context switch information being provided by an operating system or a trace tool. The invention accurately depicts nested event-pairs, and allows a user to view either a nested or unnested visualization.

The invention is carried out by a computer system which has at least a visual operator interface, an operating system for operating applications within the computer system, and memory for storing at least part of an application. A system trace file is loaded into storage. This trace file is parsed, and the parsed data is formatted so that it can be presented by a visualization tool. The data is formatted by the parser in such a way that separate timelines of schedulable events can be presented by the visualization tool. Also, nested event-pairs may be viewed, and system resource allocation is accurately shown at all times.

It is an advantage of the present invention that system operation trace files are accurately parsed into schedulable processes without reliance on explicit context switching messages from a trace tool. It is a further advantage of the present invention that nested event-pairs are accurately detected and formatted for display by a visualization tool.

Other advantages of the invention and a more complete understanding of the invention may be had by referring to the following description taken in conjunction with the accompanying drawings.

DETAILED DESCRIPTION OF A PREFERRED EMBODIMENT OF THE INVENTION

A prior art visualization tool has been described above in the description of related art section herein.

Figure 4:
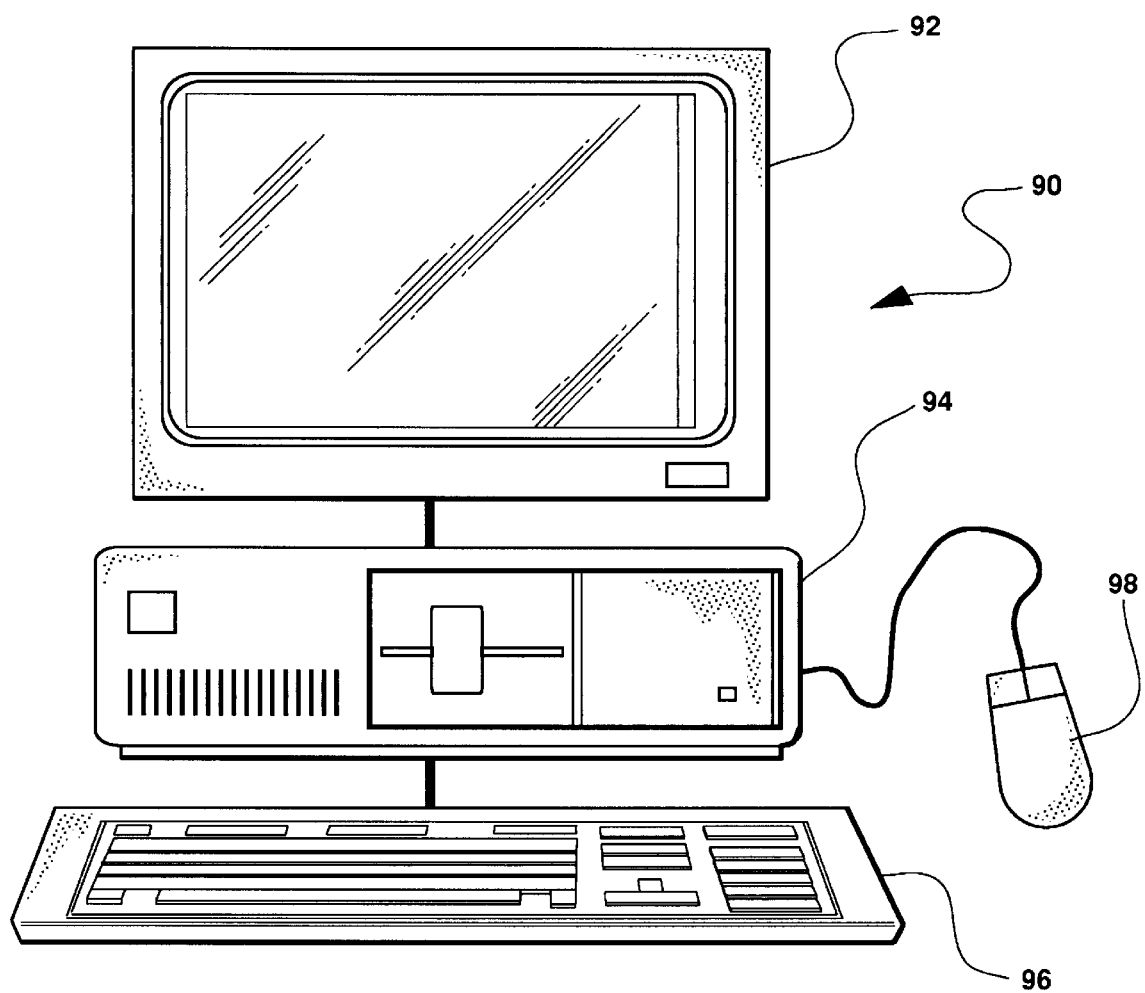
FIG. 4 is a diagram of a computer system that is capable of executing visualization software applications in accordance with the present invention.

Referring now to FIG. 4, a computer system 90 that is capable of executing visualization tool software applications is shown. The computer system 90 comprises a display device 92, a processor 94, a keyboard 96, and a mouse 98. Tracing data is received and processed within the processor 94. Data output from a visualization tool is displayed graphically within the display device 92. A user may determine the portion of the data displayed within the display device 92 by using the keyboard 96 or the mouse 98.

Figure 1:
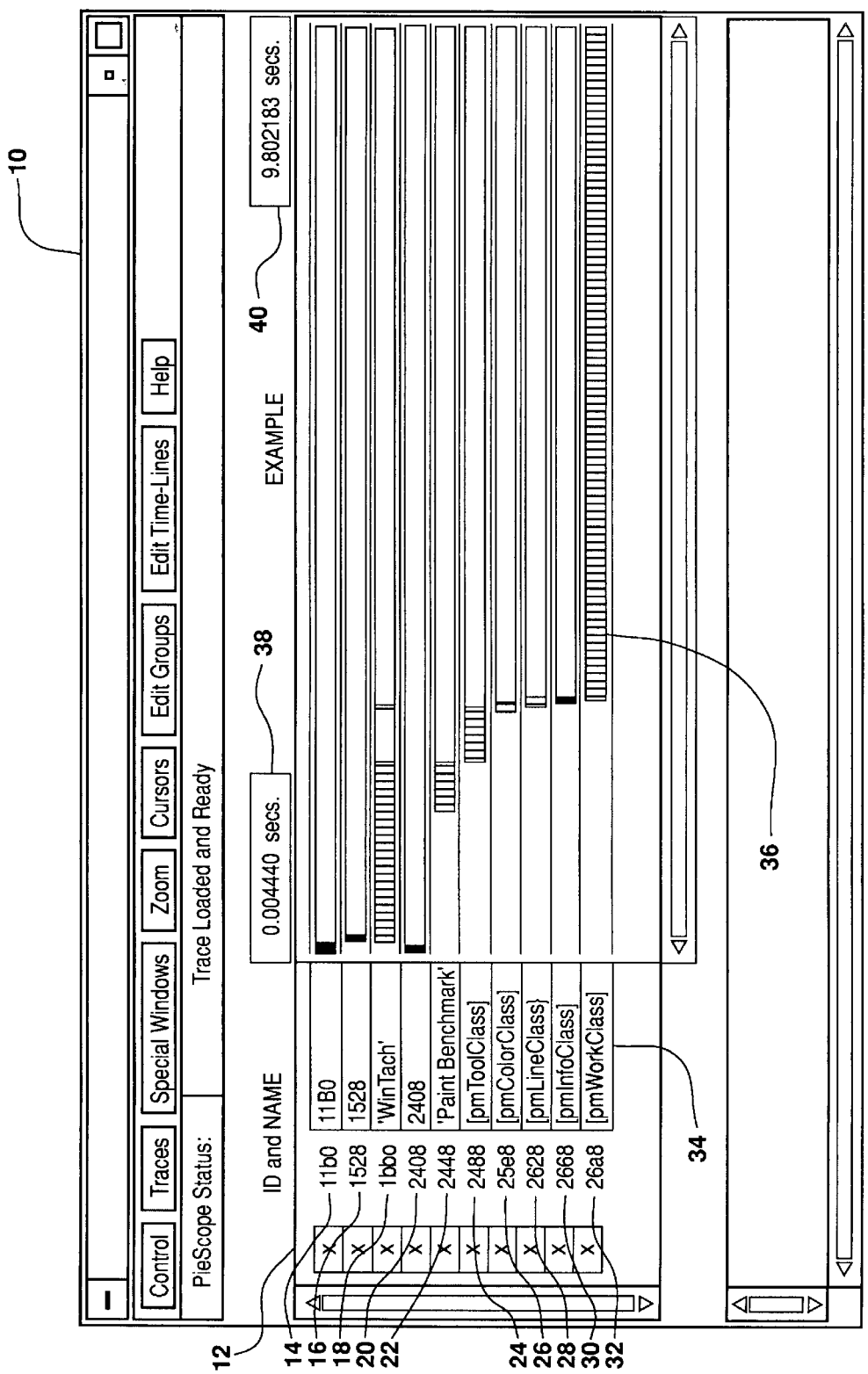
FIG. 1 is a screen display of a Windows trace as displayed by a prior art visualization tool.
Figure 2:
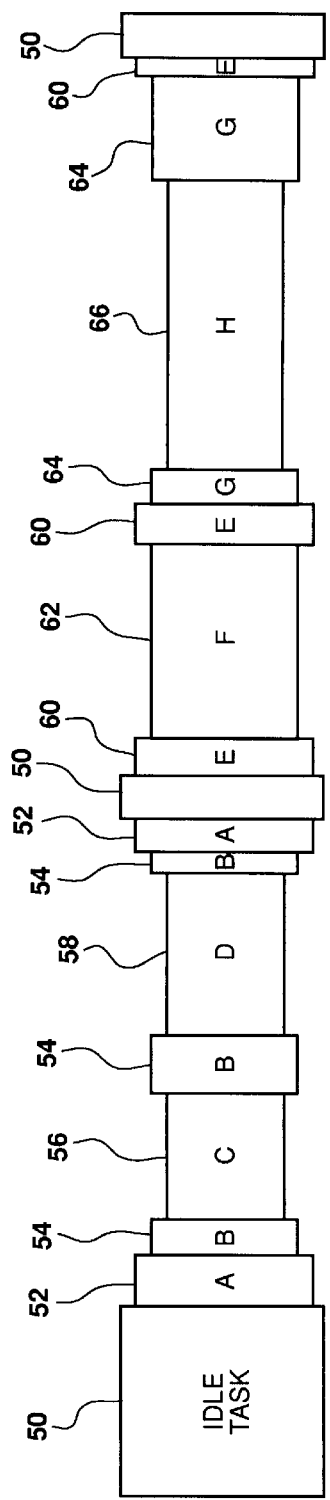
FIG. 2 is a view of one process, containing many nested event pairs, as displayed by a prior art visualization tool.
Figure 5:
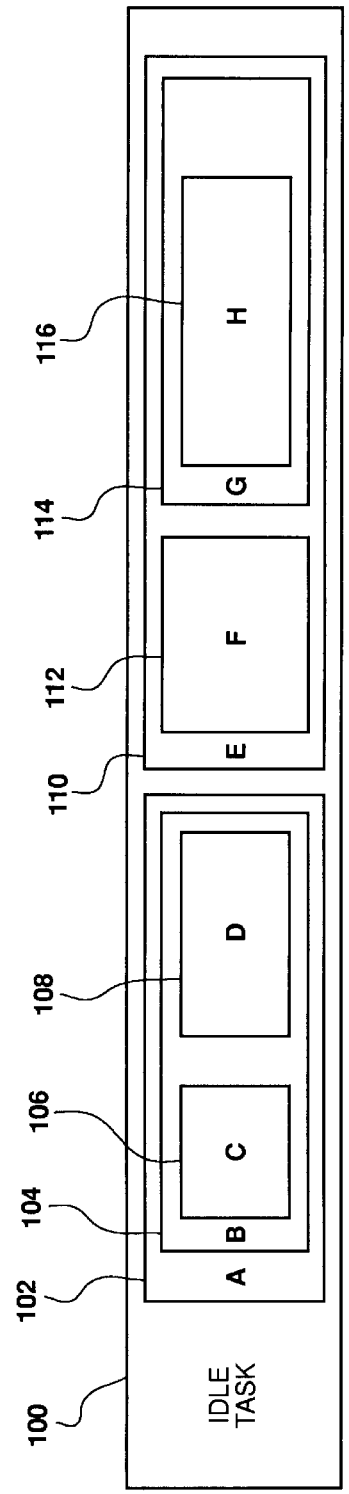
FIG. 5 is a view of one process, shown with proper nesting of event-pairs, in accordance with the present invention.
Figure 3:
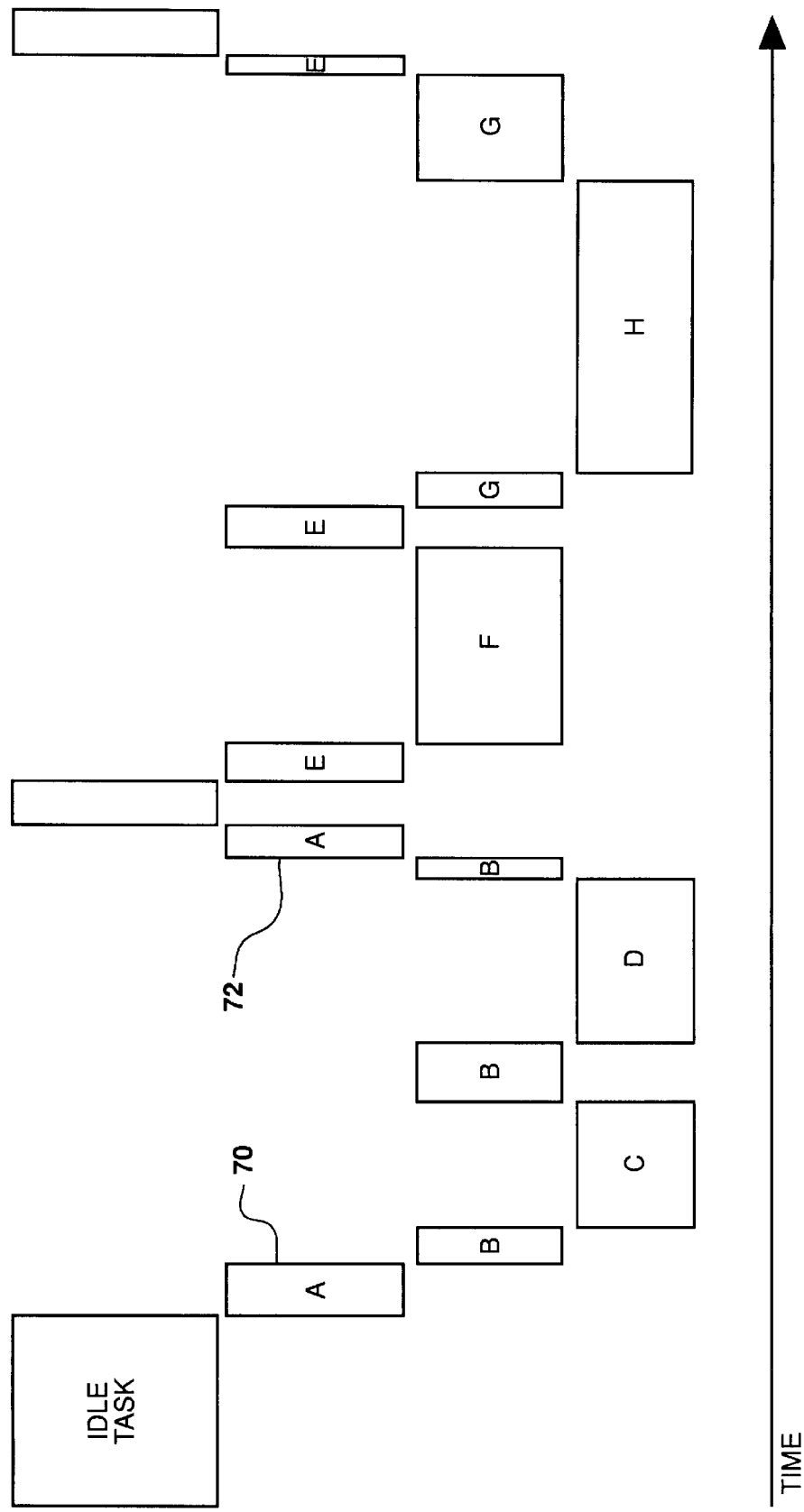
FIG. 3 is a possible spread visualization of the process running in FIG. 2, as displayed by a prior art visualization tool.

FIG. 5 depicts one process line from a visualization tool in accordance with the present invention. Note that the rectangles are shown with different heights for illustration purposes only. In the preferred embodiment of the present invention, the height of the rectangles is uniform across all levels of the occurrence hierarchy. Initially, the idle task 100 has control. Event-pair A 102 then begins to execute. While event-pair A 102 is executing, event-pair B 104 executes. Event-pair B 104 is wholly nested within event-pair A 102. Similarly, event-pairs C 106 and D 108 are wholly nested within event-pair B 104. When event-pair A 102 ends its execution, control is returned to the idle task 100. Next, event-pair E 110 executes. Note that event-pairs F 112 and G 114 are wholly nested within event-pair E, and event-pair H 116 is wholly nested within event-pair G 114.

Figure 6:
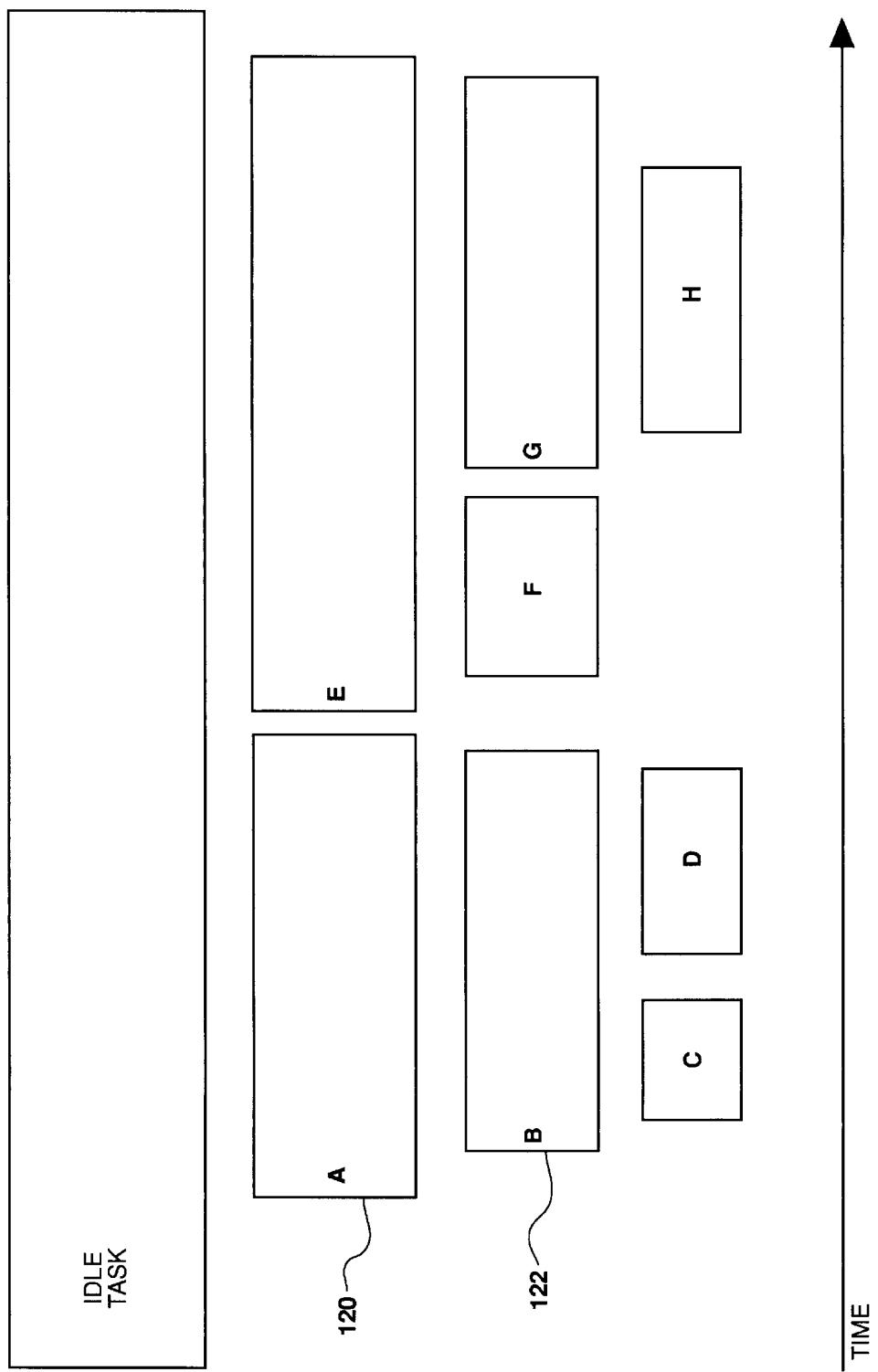
FIG. 6 is a spread visualization of the process shown in FIG. 5.

FIG. 6 depicts a spread view of the process in FIG. 5. In accordance with the present invention, nesting is properly shown. For example, it is apparent from the drawing that event-pair A 120 is a single event-pair, with one start and one end, and that event-pair B 122 is wholly nested within event-pair A 120.

Figure 7:
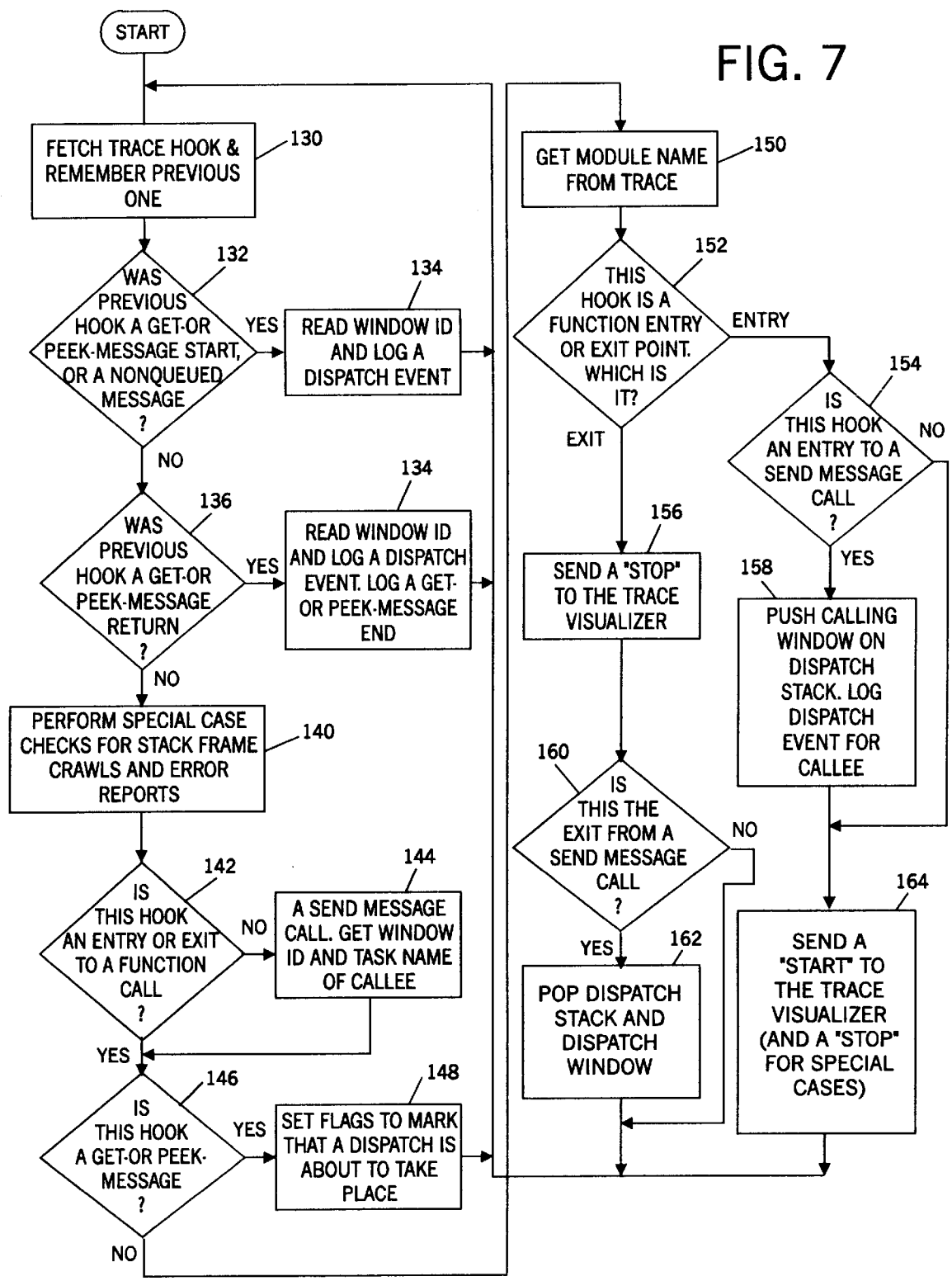
FIG. 7 is a flow chart describing the operation of a system embodying the present invention.

FIG. 7 is a flow chart of one embodiment of the present invention. FIG. 7 depicts the present invention as applied to parsing a systems operation trace of applications programs executing under Microsoft Windows. However, it should be noted that this invention is not limited to parsing Windows traces.

Referring now to FIG. 7, a method of parsing a systems operations trace in accordance with the present invention is shown. A "hook" is a text line from a trace text file. As shown in logic step 130, the software application program implementing the present invention fetches one hook at a time from the trace text file. The program remembers the previous hook, and thus is working with two hooks at one time—the current hook and the previous hook.

After fetching a new current hook (and saving the old current hook as the previous hook) in logic step 130, the program checks the previous hook in logic step 132. If the previous hook is a Get Message start, a Peek Message start, or a nonqueued message, the program proceeds to logic step 134 where it logs a dispatch event, or context switch. If the answer posed by the question in logic block 132 is no, the program proceeds to logic step 136. In logic step 136, the program checks to see if the previous hook is either a Get Message or Peek Message return. If so, the program logs a context switch (dispatch event) in logic step 138, and also logs a Get Message or Peek Message end.

If the answers to the questions in logic steps 132 and 136 are both no, then the program proceeds to logic step 140 where it performs error-checking, and then to logic step 142 where it determines if the present hook is a function call entry or exit. If neither a function call entry nor exit, the present hook must be a Send Message call as shown in logic step 144. The program saves the Window ID and task name of the callee and proceeds to logic step 146. If the present hook is not a Send Message call, the program merely proceeds to logic step 146.

In logic step 146, the program determines if the current hook is a Get Message or a Peek Message. If so, the program sets an indicator flag that a context switch is about to take place (see logic step 148) and then returns to the beginning of the routine. If not, the program knows, by process of elimination, that the current hook is a function entry or exit point, and saves the module name as shown in logic steps 150 and 152. The program then takes two different paths, depending on whether the current hook is a function entry or exit.

If the current hook is a function entry, the program then determines if the hook is an entry to a Send Message call as shown in logic step 154. If so, the program pushes the calling window on the dispatch stack and logs a context switch for the callee in logic step 158. The program then proceeds to logic step 164. If the current hook is not an entry to a Send Message call, the program simply proceeds from logic step 154 directly to logic step 164. In logic step 164, the program sends a "start" to the trace visualizer. A "start" signifies that a function has started executing, or a task has started running. In some special cases, logic step 164 sends a "stop" to the trace visualizer, which indicates that a function has completed execution, or a task is no longer running. The program then returns to the beginning of the routine and fetches the next trace hook, as shown in logic step 130.

If the current hook is a function exit, rather than a function entry, the program sends a "stop" to the trace visualizer as shown in logic step 156. Next, in logic step 160, the program determines if the exit is from a Send Message call. If so, the program pops the associated window off the dispatch stack as shown in logic step 162, and then returns to the beginning of the routine. If not, the program simply returns to the beginning and fetches the next hook as shown in logic step 130.

The foregoing description of parsing a Windows trace is for purposes of illustration only and should not be construed to limit the invention to any particular type of system or application. The scope of this invention should be limited only by the following claims and equivalents thereof.

What is claimed is:

1. A method for displaying trace information, generated in a cooperative multitasking information handling system, comprising:

loading a trace file containing system scheduling information into a storage;

parsing the system scheduling information contained in the trace file into one or more timelines, wherein each timeline contains one or more event-pairs, and wherein event-pairs may be nested within one another, and wherein the parsing includes the following:

saving a first trace hook;

saving a second trace hook;

if the first trace hook is one of a predetermined first set of instructions, logging a first dispatch event for a visualization tool, wherein the first dispatch event corresponds to an event-pair start;

if the first trace hook is not one of the predetermined first set of instructions, performing the following:

if the first trace hook is one of a predetermined second set of instructions, logging a second dispatch event for the visualization tool, wherein the second dispatch event corresponds to an event-pair stop;

if the first trace hook is not one of the predetermined second set of instructions, performing the following:

if the second trace hook is a function entry point, sending the event-pair start to the visualization tool;

if the second trace hook is a function exit point, sending the event-pair stop to the visualization tool; and displaying the timelines on a display means using the visualization tool.

2. A method according to claim 1, further comprising:

if the second trace hook is one of a predetermined third set of instructions, setting one or more flags to indicate that a dispatch event is about to take place.

3. A method according to claim 2, wherein the predetermined third set of instructions includes a get-message instruction and a peek-message instruction.

4. A method according to claim 1, further comprising:

determining if the second trace hook is a send message call entry instruction;

if the second trace hook is the send message call entry instruction, then performing the following:

pushing a calling window on a dispatch stack; and logging a dispatch event for a callee.

5. A method according to claim 4, further comprising:

if the second trace hook is a send message call exit instruction, popping the calling window from the dispatch stack.

6. A method according to claim 1, wherein the predetermined first set of instructions includes a get-message start instruction, a peek-message start instruction, and a nonqueued message instruction.

7. A method according to claim 1, wherein the predetermined second set of instructions includes a get-message return instruction, and a peek-message return instruction.

8. A method according to claim 1, wherein the displaying further comprises displaying a first event-pair wholly nested within a second event-pair as a separate timeline.

9. An information handling system, comprising:

one or more processors;

a storage means;

a display means;

an operating system for controlling the one or more processors;

means for loading a trace file containing system scheduling information into the storage means, wherein the system scheduling information is generated in a cooperative multitasking system;

means for parsing the system scheduling information contained in the trace file into one or more timelines, wherein each timeline contains one or more event-pairs, and wherein event-pairs may be nested within one another, and wherein the means for parsing includes the following:

means for saving a first trace hook;

means for saving a second trace hook;

means for determining if the first trace hook is one of a predetermined first set of instructions;

means for logging a first dispatch event for a visualization tool if the first trace hook is one of the predetermined first set of instructions, wherein the first dispatch event corresponds to an event-pair start;

means for determining if the first trace hook is one of a predetermined second set of instructions;

means for logging a second dispatch event for the visualization tool if the first trace hook is one of the predetermined second set of instructions, wherein the second dispatch event corresponds to an event-pair stop;

means for determining if the second trace hook is a function entry point;

means for sending the event-pair start to the visualization tool if the second trace hook is the function entry point;

means for determining if the second trace hook is a function exit point;

means for sending the event-pair stop to the visualization tool if the second trace hook is the function exit point; and means for displaying the timelines on the display means using the visualization tool.

10. An information handling system according to claim 9, further comprising:

means for setting one or more flags to indicate that a dispatch event is about to take place if the second trace hook is one of a predetermined third set of instructions.

11. An information handling system according to claim 10, wherein the predetermined third set of instructions includes a get-message instruction and a peek-message instruction.

12. An information handling system according to claim 9, wherein the predetermined first set of instructions includes a get-message start instruction, a peek-message start instruction, and a nonqueued message instruction.

13. An information handling system according to claim 9, wherein the predetermined second set of instructions includes a get-message return instruction, and a peek-message return instruction.

14. An information handling system according to claim 9, wherein the means for displaying further comprises means for displaying a first event-pair wholly nested within a second event-pair as a separate timeline.

15. A computer-readable medium for displaying system operation trace information on a display device, comprising:

means for loading a trace file containing system scheduling information into a storage means, wherein the system scheduling information is generated in a cooperative multitasking system;

means for parsing the system scheduling information contained in the trace file into one or more timelines, wherein each timeline contains one or more event-pairs, and wherein event-pairs may be nested within one another, and wherein the means for parsing includes the following:

means for saving a first trace hook;

means for saving a second trace hook;

means for determining if the first trace hook is one of a predetermined first set of instructions;

means for logging a first dispatch event for a visualization tool if the first trace hook is one of the predetermined first set of instructions,
wherein the first dispatch event corresponds to an event-pair start;
means for determining if the first trace hook is one of a predetermined second set of instructions;
means for logging a second dispatch event for the visualization tool if the first trace hook is one of the predetermined second set of instructions,
wherein the second dispatch event corresponds to an event-pair stop;
means for determining if the second trace hook is a function entry point;
means for sending the event-pair start to the visualization tool if the second trace hook is the function entry point;
means for determining if the second trace hook is a function exit point;
means for sending the event-pair stop to the visualization tool if the second trace hook is the function exit point; and
means for displaying the timelines on the display device using the visualization tool.

16. A computer-readable medium according to claim 15, further comprising:

means for setting one or more flags to indicate that a dispatch event is about to take place if the second trace hook is one of a predetermined third set of instructions.

17. A computer-readable medium according to claim 16, wherein the predetermined third set of instructions includes a get-message instruction and a peek-message instruction.

18. A computer-readable medium according to claim 15, wherein the predetermined first set of instructions includes a get-message start instruction, a peek-message start instruction, and a nonqueued message instruction.

19. A computer-readable medium according to claim 15, wherein the predetermined second set of instructions includes a get-message return instruction, and a peek-message return instruction.

20. A computer-readable medium according to claim 15, wherein the means for displaying further comprises means for displaying a first event-pair wholly nested within a second event-pair as a separate timeline.

* * * * *